United States Patent [19]

Lapp et al.

[11] Patent Number: 5,741,176
[45] Date of Patent: Apr. 21, 1998

[54] SKIN-HOLDING VENT CUTTER

[75] Inventors: William W. Lapp; Marcus M. Moore; Joseph M. Walker, all of Gainesville; Raymond F. Strawn, Flowery Branch, all of Ga.

[73] Assignee: Stork Gamco Inc., Gainesville, Ga.

[21] Appl. No.: 687,756

[22] Filed: Jul. 26, 1996

[51] Int. Cl.$^6$ .................................................. A22C 21/06
[52] U.S. Cl. .................................................. 452/122
[58] Field of Search .................................. 452/122, 120

[56] References Cited

U.S. PATENT DOCUMENTS

| | | |
|---|---|---|
| 3,555,593 | 1/1971 | Scheier . |
| 3,653,093 | 4/1972 | Scheier . |
| 3,705,440 | 12/1972 | Lewis ................................. 452/122 |
| 4,023,237 | 5/1977 | Meyn . |
| 4,117,570 | 10/1978 | Meyn . |
| 4,155,146 | 5/1979 | Meyn . |
| 5,123,871 | 6/1992 | van den Nieuwelaar . |
| 5,133,686 | 7/1992 | van den Nieuwelaar . |
| 5,199,922 | 4/1993 | Korenberg et al. ........................ 452/122 |
| 5,248,277 | 9/1993 | Bos et al. . |
| 5,499,390 | 3/1996 | Van Ochten et al. . |
| 5,580,304 | 12/1996 | Bleth et al. ................................. 452/122 |

FOREIGN PATENT DOCUMENTS

| | | |
|---|---|---|
| 9002712 | 5/1992 | Netherlands . |
| WO 92/06597 | 4/1992 | WIPO . |

*Primary Examiner*—Willis Little
*Attorney, Agent, or Firm*—Kilpatrick Stockton LLP; John S. Pratt, Esq.; Mitchell G. Stockwell, Esq.

[57] ABSTRACT

A device is disclosed that completely cuts out and removes the vent, including its orbicular muscle, of a slaughtered animal, such as poultry, pigs or other such animals. A centering pin nests within a holding element that has a roughened face surface for capturing the skin of the animal around the vent. The holding element is coaxial with a generally cylindrical, rotary cutter. The pin inserts into the vent and the holding element is then extended to contact the skin of the animal near the vent. The pin, which terminates in a cone-shaped knob, is then moved slightly away from the animal and toward the holding element, thereby capturing the orbicular muscle of the vent between the shoulder of the pin and a recess within the holding element. The holding element has a roughened face surface, preferably beveled, which contacts the skin and may form it into folds for easier cutting. The holding element is nested within and coaxial to the cutter; only a very small gap separates the holding element from the cutter. This causes the cutter and the holding element to cooperate to cut through the skin with a shearing action, thereby improving the ability of the device to remove completely the vent. When grooves are used to roughen the face surface, the grooves form folds within the skin. Such folds further improve the ability of the cutter to slice through the skin of the animal and thereby completely cut out and remove the orbicular muscle.

20 Claims, 3 Drawing Sheets

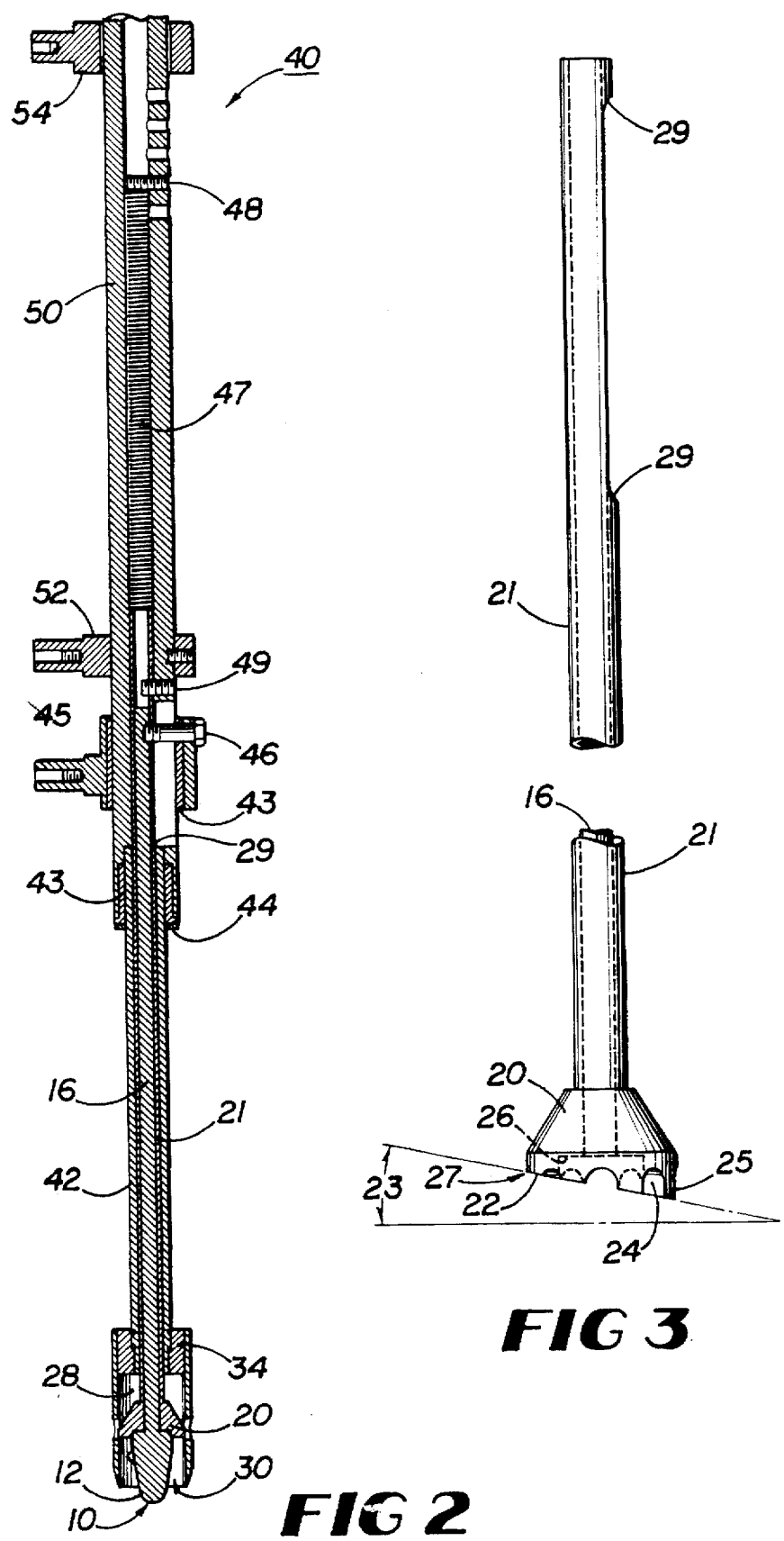

SKIN-HOLDING VENT CUTTER

This invention is a device for cutting out the vent, which is the excretory canal of a slaughtered animal, such as poultry, pigs, other mammals or the like, in order to cut the vent completely out. The device uses a holding element to capture the skin surrounding the vent. A cutter cooperates with the holding element in order to cut through the typically highly-elastic skin with a shearing action.

BACKGROUND OF THE INVENTION

Vents of slaughtered animals such as poultry, pigs or the like must be cut out and removed during processing, typically as a prelude to eviscerating the animal. At least in the United States, regulations require complete removal of the vent, including the orbicular muscle surrounding the vent exit.

Various devices exist for cutting out the vent of slaughtered animals. Many devices, such as those disclosed in U.S. Pat. Nos. 4,117,570, 4,155,146 and 5,499,390, use centering pins that insert into the vent and guide or center (with respect to the vent) an axially-movable, rotary cutter that extends toward a carefully positioned carcass and cuts out the vent.

Devices also exist for clamping or positioning the orbicular muscle before cutting. U.S. Pat. No. 4,023,237 discloses a "clamping sleeve" that cooperates with an onion-shaped probe to clamp the orbicular muscle. A rotating cutter is then used to "tear the fowl's skin." Col. 3, lines 38–40. Another U.S. Pat. No. 5,133,686 fixes the orbicular muscle in place before cutting by using an annular gap carefully-sized to capture the orbicular muscle. U.S. Pat. No. 5,123,871 discloses pins that pierce the orbicular muscle to clamp it in place before cutting. Pulling the clamped orbicular muscle away from the carcass draws the intestines at least partially out.

But these devices cannot obtain a good grip on the orbicular muscle in order to better withstand the sudden cutting action produced by the cutter. Thus, the cut sometimes is improperly made, possibly leading to contamination within the carcass. Additionally, vent cutters are often placed on a rotary processor that operates on poultry or other carcasses suspended from an adjacent overhead conveyor and clamped to the processor during vent removal. Some machines leave a piece of orbicular muscle on a small number of carcasses. Possibly, this failure completely to cut out the orbicular muscle is caused by the movement of the rotary apparatus (the uncut orbicular muscle often occurs on the edge of the carcass trailing the direction of rotary movement) or the high elasticity of the animal skin that must be cut. In any event, left-over bits of orbicular muscle hurt the quality scores for the processing plants and may ultimately reduce the quality of the product.

SUMMARY OF THE INVENTION

This invention overcomes the above problems by providing a holding element that holds the skin of the animal surrounding the vent exit. The holding element thereby prevents the skin from twisting when cut by the rotary cutter. The face surface of the holding element may be beveled to provide more surface area for contacting the skin. The increased surface area can better withstand the initiation of cutting action. That cutting action begins first only at the "high" point of the bevel, which causes the cutting action to build up more smoothly, improving the cut. Also, the face surface preferably may be roughened in order to capture and hold the skin, preventing it from the typical twisting that makes cutting more difficult. For example, a series of grooves may be formed in the face surface. Such grooves capture and hold the skin. The grooves also form the skin into folds that are easier to cut through than the unfolded, elastic skin of the typical animal carcass.

Additionally, the holding element cooperates with the rotary cutter to cut through the skin with a shearing action that makes a cleaner, better cut. In order to create such a shearing action, the cutter and holding element are positioned fairly close to one another, separated only by a small annular gap whose width ranges from about 0.1 to 1 millimeters (mm).

An elongated centering pin terminating in a knob may be coaxial to and nested within the holding element, which, in turn, is coaxial to and nested within a rotary cutter. The rotary cutter may be generally cylindrical in shape. Each of these elements can move toward and away from a slaughtered animal, which is typically suspended from an overhead conveyor adjacent to a rotary processing machine holding numerous assemblies containing the pin, holding element and cutter. Clamping devices on the processor fix the poultry carcasses in position for cutting.

In operation, blocks connected to each of the various assemblies slide within corresponding tracks in the processor. The slide blocks, in turn, move the various elements of each assembly. For instance, the tracks and blocks can be arranged so that as the processor rotates, tracks move a sliding block down, which moves the centering pin into the vent of a poultry carcass held in an overhead conveyor and clamped to the side of the processor underneath the pin. The holding element is similarly moved toward the carcass. The terminating knob on the pin passes through the orbicular muscle into the vent. The resilient orbicular muscle closes around the pin shaft that has a smaller diameter than the knob on its terminating end. Meanwhile, the holding element has been brought to abut against the skin of the animal surrounding the vent. The face surface or the holding element may be appropriately beveled to improve contact with the carcass.

Just after cutting begins, slide blocks move the pin toward the holding element, which has a recess that cooperates with the shoulder of the knob to clasp the orbicular muscle. Moving the pin and holding element slightly further away from the carcass lifts the clamped orbicular muscle.

The pin and holding element clasp the orbicular muscle between them. Also, the skin is held by the roughened face surface of the holding element. Because the cutter and holding element are fairly close to one another, a shearing force is created that improves cutting of the skin. Cutting may be further improved by using grooves to roughen the face surface. The grooves form folds in the skin, allowing the rotary cutter initially to focus its cutting forces on the tops of the folds.

After cutting, the pin and holding element are retracted from the carcass to pull away the orbicular muscle and an attached section of intestine. Separating the pin and holding element then releases the completely cut free orbicular muscle.

It is accordingly an object of the present invention to provide apparatus for completely removing the vents, including the orbicular muscles, of slaughtered animal such as poultry, pigs or the like.

It is an additional object of the invention to provide a holding element for capturing the skin of an animal carcass for improved cutting.

It is yet another object of the invention to provide a cutter that cooperates with the holding element to shear through the skin of the animal.

Other objects, features and advantages of the present invention will become apparent upon reading the rest of this document.

BRIEF DESCRIPTION OF THE DRAWINGS

FIG. 2 shows a side, cross-sectional view of the vent cutter and assembly of the present invention.

FIG. 3 shows a side view of the holding element used in the vent cutter of the present invention.

DETAILED DESCRIPTION OF THE DRAWINGS

Figure 1:
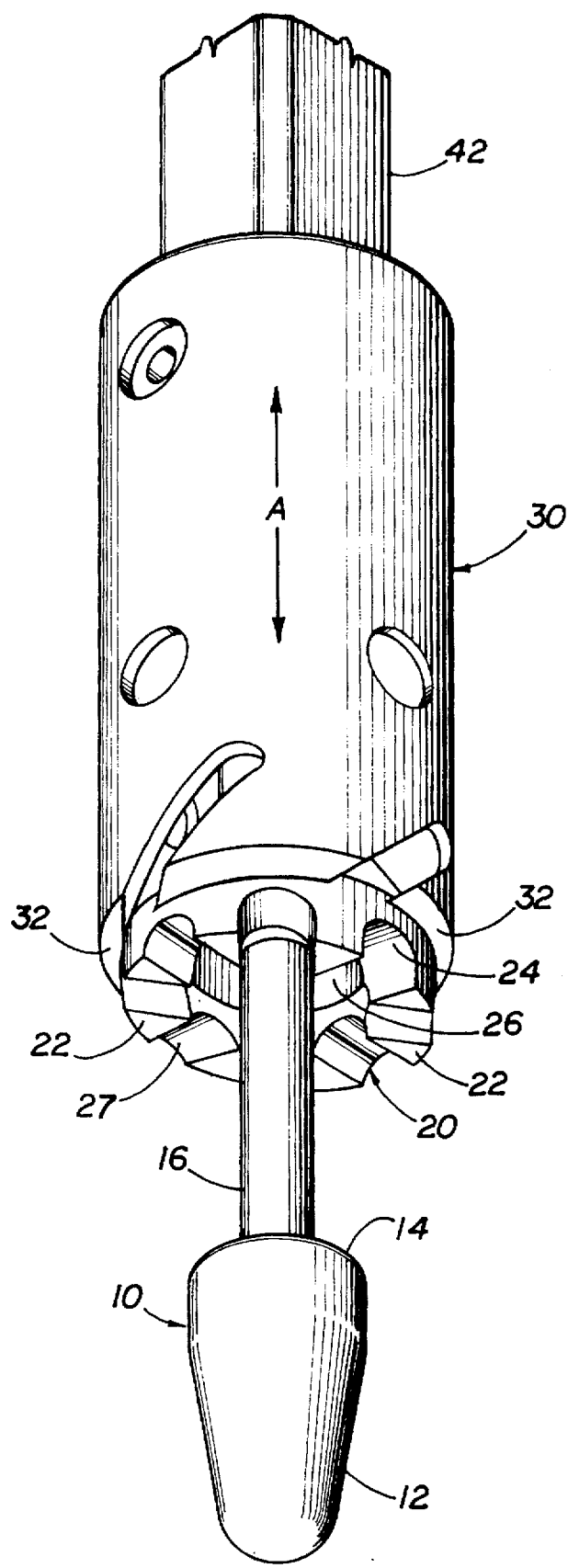
FIG. 1 shows a perspective view of the vent cutter of the present invention.

FIG. 1 shows a perspective view of the vent cutter of the present invention. A centering pin 10 terminates in a generally cone-shaped probe 12 forming a shoulder 14 that leads to an elongated shaft 16. The centering pin 10 is coaxial to a holding element 20, shown as a partial, hollowed cylinder. Pin shaft 16 extends from and retracts into the holding element 20 so that the shoulder 14 of the probe 12 is drawn into a recess 26 formed in the holding element 20, as shown in FIG. 2. Both the pin 10 and holding element 20 may be nested within and coaxial to a rotary cutter 30 in order to form an assembly 40.

A small annular space separates the outside of the holding element 20 from the inside of the cutter 30. The annular space between the holding element 20 and cutter 30 shown in the FIG. 1 embodiment is about 0.25 millimeters ("mm") wide. (This 0.25 mm width is the difference between the outer and inner diameters defining the annular space). However, the annular space may range between about 0.1 and 1 mm. Even more or less separation can be used so long as the cutter 30 can cooperate with the holding element 20 to shear through the skin.

FIGS. 2 and 3 perhaps better show the structure of the assembly 40. Pin 10 has a solid shaft 16 passing through a bore 28 in the holding element 20. The terminating end of the holding element 20 forms the recess 26 into which the shoulders 14 of the cone-shaped probe 12 seat. Pin shaft 16 extends through a hollow shaft 21 that, in turn, extends through a square shaft 42. Square shaft 42 rotates in order to spin blades 32 on the rotary cutter 30, which attaches to the square shaft 42 via a retainer 34. Since the square shaft 42 rotates, it connects to a fixed shaft 50 through a bushing 43 and washer 44 arrangement.

Pin shaft 16 and hollow shaft 21 may extend and retract within the square shaft 42; but neither the pin shaft 16 nor the hollow shaft 21 rotates. Moving a first slide block 45 within a track or slot also moves the pin 10 and holding element 20. A bolt 46 secures first slide block 45 to the pin shaft 16. When the slide block 45 slides sufficiently far within its track, shoulder 14 engages recess 26, thereby also moving holding element 20. A spring 47 biases the hollow shaft 21 toward blades 32 on the cutter 30. The initial bias of the spring 47 may be adjusted by relocating into any of a number of spaced holes a set screw 48 against which one end of spring 47 bears. Another set screw 49 holds holding element 20 inside shaft 50 by protruding into slot 29.

Figure 4:
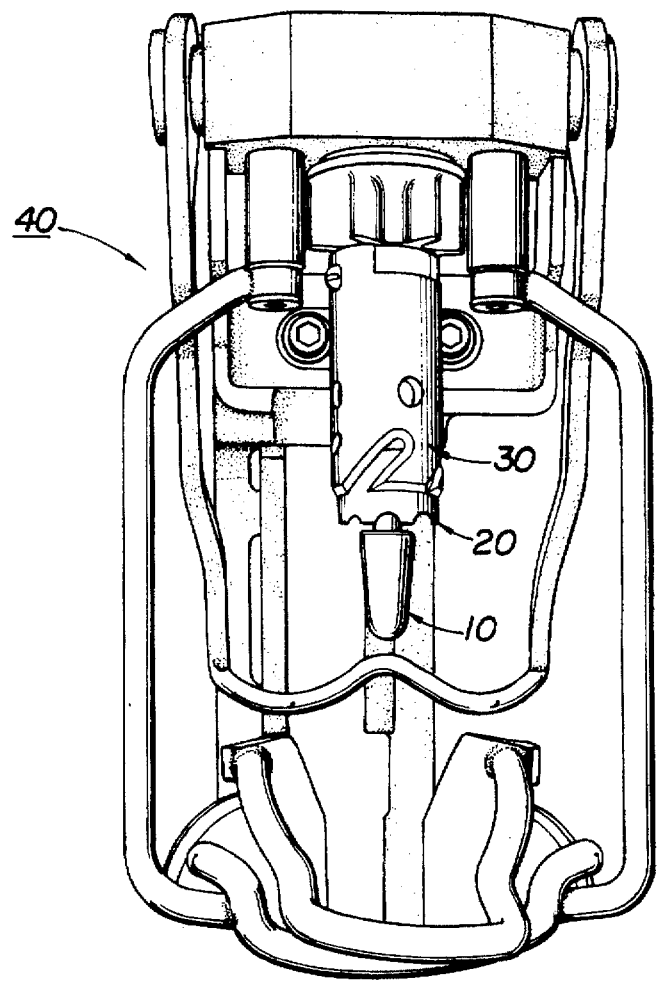
FIG. 4 shows a front view of the vent cutter of the present invention.

Moving a second block 52 within a slot or track extends and retracts moving the entire assembly 40 toward and away from an animal carcass held in, for instance, the clamps shown in FIG. 4. Those clamps are operated by sliding a third block 54 within a track. As the assembly 40 continues around the rotary processor, gears (shown in FIG. 4) spin the square shaft 42 and, in turn, the blade 32. While the holding element 20 is in an end position adjacent to the carcass in order to hold the skin, slide blocks will extend the blade 32 toward the carcass held in the clamps, thereby initiating cutting and vent removal.

FIG. 3 shows additional detail about the holding element 20. A face surface 22 is formed at the terminating end of holding element 20. The face surface 22 is beveled at an angle 23 selected to maximize contact of the face surface 22 with the skin of a carcass, which typically is tilted by clamps on a processing station. For instance, angle 23 shown in FIG. 3 is at a 10° angle to a line perpendicular to the axis of hollow shaft 21.

Face surface 22 preferably is roughened so as to better capture and hold the skin of a carcass. One way to roughen the surface is to form various grooves 24 in the face surface 22 so that teeth 25 can capture and hold the skin surrounding the animal's vent. Alternatively, face surface 22 may be provided with serrated edges, small ridges or strips of abrasive material such as sandpaper or the like. But using grooves 24 and teeth 25 with the spring 47 results in the spring 47 forcing the holding element 20 toward the animal, which forces skin into grooves 24 to form the skin into folds. Grooves 24 at the back 27 of the holding element 20 need not be as deep or sharply defined as grooves 24 at the front. That is because the back 27 of the holding element 20 corresponds to the rear of the carcass, where the skin is usually fairly tight and easier to cut through. By contrast, the "belly skin" toward the front of the poultry or other carcass is looser. Thus, deeper and sharper (e.g., in terms of steeper sides) grooves 24 and teeth 25 may be formed at the front of the holding element 20 in order to better capture the loose skin and form it into folds for easier cutting. FIGS. 1–3 show that relatively deep and sharp grooves 24 may be formed by milling a radial section out of the sides of the holding element 20.

Note that the assembly 40 may be mounted in a rotary processor provided with various tracks for moving slide blocks 45, 52 and 54 in order to extend and retract elements of the assembly 40. However, the pin 10 or holding element 20 may also be extended and retracted by using hydraulics or solenoids. Also, the rotary processor may have gears or other mechanisms for rotating the square shaft 42.

Figure 5:
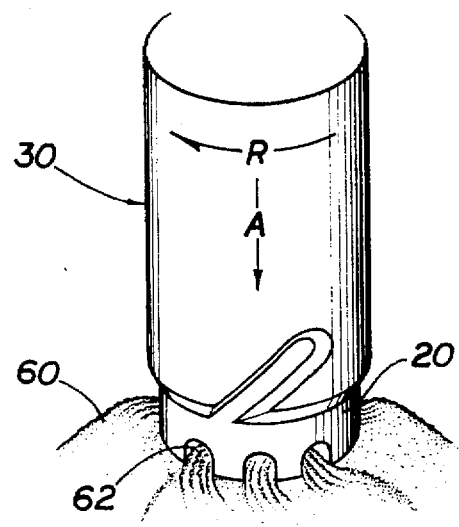
FIG. 5 shows a schematic view of the vent cutter of the present invention in use.

FIG. 5 shows a schematic view of an assembly 40 in operation. Probe 12 at the terminating end of pin 10 is located underneath skin 60 of a carcass. As the probe 12 penetrated the vent, the elastic orbicular muscle at the end of the vent stretched around the probe 12 and then contracted around the narrower shaft 16. While this occurred, the cutter 30 and holding element 20 dropped toward the carcass. The holding element 20 first reached the carcass and holds the skin in grooves 24. Cutting was started and the probe 12 was then retracted toward the holding element 20 in order to clasp the orbicular muscle between the shoulders 14 of the probe 12 and the recess 26 formed in the holding element 20, which contacts the skin 60. As FIG. 5 shows, the grooves 24 and teeth 25 captured the skin 60, forcing it into folds 62 that are thus held firmly by the holding element 20 before cutting by the rotary cutter 30. Thus, holding element 20 acts both as a sleeve for encasing the orbicular muscle and as a means for holding the skin surrounding the vent.

As rotary cutter 30 advances axially in direction "A" toward the skin 60, it rotates in direction "R". Rotating blades 32 will cooperate with the holding element 20 to cut through the skin 60 with a shearing action. Forming the skin folds 62 also improves cutting performance because the blades 32 focus their cutting forces on the smaller surface area of the folds 62.

The foregoing is provided for purposes of explanation and disclosure of preferred embodiments of the present invention. For instance, the shape of the pin, holding element or cutter may be modified, yet still fall within the following claims. Further, modifications and adaptations to the described embodiments will be apparent to those skilled in the art and may be made without departing from the scope or spirit of the invention and the following claims.

What is claimed is:

1. Apparatus for removing the vent from a slaughtered animal, the apparatus comprising:
   a. means, movable relative to the animal, for cutting the vent;
   b. means for centering the cutting means within the vent; and
   c. means for holding the skin of the animal near the vent, the holding means comprising a face surface having a series of grooves that roughen the face surface and capture the skin in order to form folds in the skin so that the centered cutting means cuts a section of the skin near the vent.

2. Apparatus according to claim 1 wherein the vent terminates with an orbicular muscle and wherein the centering means comprises an elongated pin provided with a knob on one end and the holding means further comprises a recess shaped so that the orbicular muscle can be captured between the knob and the recess.

3. Apparatus according to claim 1 wherein the face surface lies in a plane oblique to the axis of the centering means so that a first portion of the face surface is adapted to contact the skin before a second portion of the face surface, thereby assisting the holding means in holding the skin so that the cutting means can cut the skin with a shearing action.

4. Apparatus according to claim 3 wherein the grooves are radial.

5. Apparatus for removing the vent from a slaughtered animal, the apparatus comprising:
   a. means, movable relative to the animal, for cutting the vent;
   b. means for centering the cutting means within the vent; and
   c. means for holding the skin of the animal near the vent, the holding means comprising a face surface that captures the skin so that the centered cutting means cooperates with the holding means to shear through a section of the skin near the vent, wherein the face surface generally lies in a plane oblique to the axis of the centering means so that a first portion of the face surface is adapted to contact the skin before a second portion of the face surface.

6. Apparatus according to claim 5 wherein the vent terminates with an orbicular muscle and wherein the centering means comprises an elongated pin provided with a knob on one end and the holding means further comprises a recess shaped so that the orbicular muscle can be captured between the knob and the recess.

7. Apparatus according to claim 5 wherein a series of grooves roughen the face surface and capture the skin in order to form folds in the skin.

8. Apparatus according to claim 7 wherein the grooves are radial.

9. Apparatus for removing the vent from a slaughtered animal, the apparatus comprising:
   a. means, movable relative to the animal, for cutting the vent;
   b. means for centering the cutting means within the vent; and
   c. a holding element comprising a beveled face surface roughened by a series of grooves that capture the skin of the animal near the vent to form folds in the skin so that the centered cutting means shears through a section of the skin near the vent.

10. A device for completely removing the vent of a slaughtered animal, the device comprising:
    a. a rotary cutter comprising an inner edge and a cutting edge; and
    b. a generally cylindrical sleeve, nested within the cutter and adapted to move to an end position adjacent the animal, the sleeve comprising a face surface having grooves for catching the skin of the animal to hold the skin of the animal when in the end position, whereby the cutting edge cooperates with the holding means in order to shear through the skin of the animal.

11. A device according to claim 10 further comprising a centering pin for inserting into the vent, wherein the vent has an orbicular muscle and the pin comprises a probe with a shoulder shaped to fit within a recess formed by the sleeve, which probe can be drawn out of the vent to capture the orbicular muscle between the shoulder and recess.

12. A device according to claim 11 further comprising slide blocks adapted to extend and retract the pin, holding means and rotary cutter.

13. A device according to claim 10 wherein the face surface is beveled between about 5 and 20 degrees relative to a line perpendicular to the axis of the cutter.

14. Apparatus for cutting out the vent of a slaughtered animal in order completely to remove the vent, including the orbicular muscle of the vent, the apparatus comprising:
    a. an axially-movable, centering pin terminated with a generally cone-shaped knob with a shoulder;
    b. a holding element, coaxial with and surrounding the pin, movable between a first position and an end position in which the holding element bears against the skin of the animal, the holding element comprising:
       i. a face surface;
       ii. means for capturing the skin of the animal and forming the skin into folds; and
       iii. a recess, generally shaped to accept the shoulder of the knob, which recess cooperates with the axially-movable pin to clasp the orbicular muscle between the shoulder of the knob and the recess; and
    c. a generally cylindrical, rotary cutter separated from the holding element by an annular space, which cutter cooperates with the holding element to create a shearing action that cuts through the formed skin folds of the animal so that the pin and holding element can then be moved to draw the cut free orbicular muscle away from the animal.

15. Apparatus according to claim 14 wherein the face surface is beveled.

16. Apparatus according to claim 14 wherein the annular space is between 0.1 and 0.5 millimeters wide.

17. A holding device for use with an apparatus having an axially movable pin terminated with a generally cone-shaped knob with a shoulder and a generally cylindrical, rotary cutter for cutting out the vent of a slaughtered animal in order completely to remove the vent, including the orbicular muscle of the vent, the holding device comprising a holding element, coaxial with and surrounding the pin, movable between a first position and an end position in which the holding element bears against the skin of the animal, the holding element comprising:

a. a face surface;
  b. means for capturing the skin of the animal and forming the skin into folds; and
  c. a recess, generally shaped to accept the shoulder of the knob, which recess cooperates with the axially-movable pin to clasp the orbicular muscle between the shoulder of the knob and the recess.

18. A holding device according to claim 17 wherein the face surface is beveled between about 5 and 20 degrees relative to a line perpendicular to the axis of the pin.

19. A holding device according to claim 18 wherein the capturing means comprises a series of grooves that roughen the face surface and capture the skin in order to form folds in the skin.

20. A holding device according to claim 19 wherein the grooves are radial.

* * * * *